W. B. WIGLE.
CLAMP.
APPLICATION FILED JUNE 28, 1919.
1,342,141.
Patented June 1, 1920.
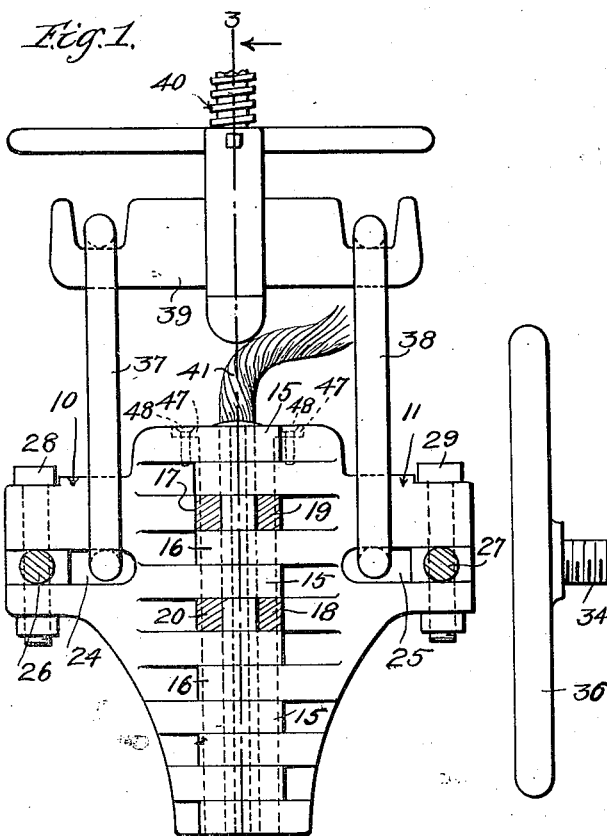
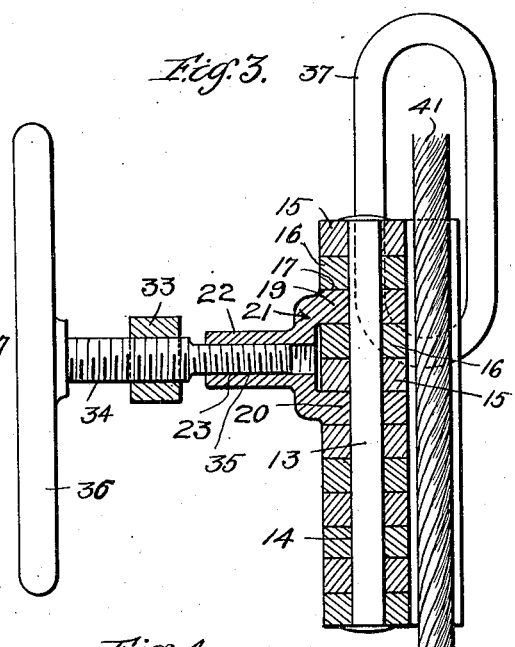
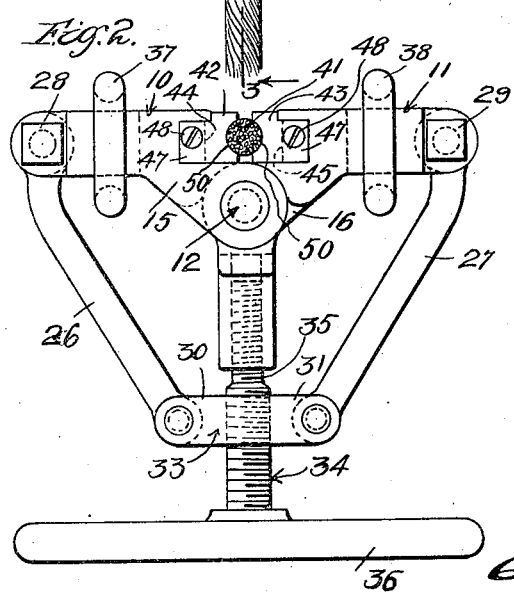
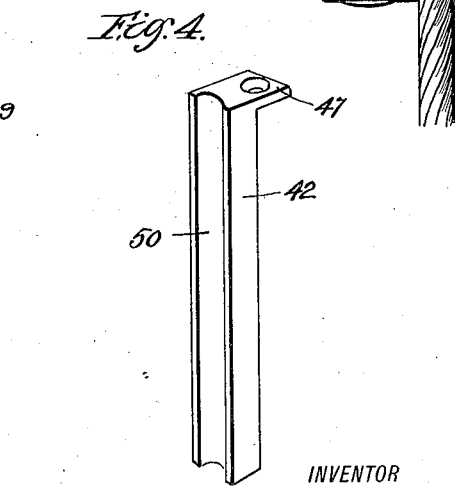
INVENTOR
Wilson B. Wigle
ATTORNEY

UNITED STATES PATENT OFFICE.

WILSON B. WIGLE, OF MONTEBELLO, CALIFORNIA.

CLAMP.

1,342,141.

Specification of Letters Patent.

Patented June 1, 1920.

Application filed June 28, 1919. Serial No. 307,406.

*To all whom it may concern:*

Be it known that I, WILSON B. WIGLE, a citizen of the Dominion of Canada, residing at Montebello, in the county of Los Angeles and State of California, have invented new and useful Improvements in Clamps, of which the following is a specification.

This invention relates to clamps, and is particularly adapted to be used for clamping a cable used for lowering and operating tools in oil wells, and as at present contemplated is designed to be conveniently hung to what is known as a temper screw, in the usual manner.

The object of this invention is to provide a clamp which may be quickly adjusted to, or removed from a cable, without buckling or marring the same, in such a manner as to obviate all possibility of slippage between said cable and clamp.

The above and other objects will appear in the following description, will be pointed out in the appended claims and illustrated in the accompanying drawings, in which:

Figure 1 is a front view of my invention shown clamped to a piece of cable, and suspended from the lower portion of a temper screw.

Fig. 2 is a plan view of my invention.

Fig. 3 is a vertical section of my invention taken on the line 3—3 of Fig. 1.

Fig. 4 is a view in perspective of one of the detachable clamping jaws.

Referring more specifically to the several figures of the drawing, 10 and 11 represent a pair of clamping members which are hinged together at 12 by means of the pin 13, which passes through apertures 14 formed in ears 15 and 16 which are respectively integral with members 10 and 11 and adapted to alternate with one another, as clearly shown. One of each of the ears 15 and 16 are omitted, thus leaving spaces 17 and 18 to receive the forked ends 19 and 20 of a yoke 21, which are also provided with apertures through which the pin 13 passes. The yoke 21 is provided with the outwardly extending boss 22 having a centrally disposed threaded bore 23.

The outer extremities of members 10 and 11 are provided respectively with slots 24 and 25 into which are inserted the ends of links 26 and 27, which are provided with bores adapted to register with bores in the members 10 and 11 through which the bolts 28 and 29 pass, thus forming a hinge joint. The opposite ends of links 26 and 27 are also provided respectively with bores adapted to register with bores formed in the outwardly extending ears 30 and 31 of the nut 33.

Threaded into the bore of the nut 33 is the stem 34 provided with the hand wheel 36. The stem 34 is provided with a reduced threaded portion 35, which is threaded into the bore 23 of the yoke 21. The threads on the stem 34 and the reduced portion 35 are oppositely disposed, that is to say the threads on the stem 34 are left handed, and the threads on portion 35 are right handed or contrariwise.

Links 37 and 38 engage respectively in the slots 24 and 25, extend upwardly and are adapted to hook over the lower cross bar 39 of the temper screw 40.

The cable 41 is adapted to be impinged between the clamping jaws 42 and 43 preferably formed of hardened steel, resting respectively in vertically disposed grooves 44 and 45 in members 10 and 11. Each of said clamping jaws is provided with a flange 47 adapted to rest in indents formed in the top surfaces of members 10 and 11, and to be secured in position by means of a screw 48 which passes through an operture in the flange 47 and is threaded into a tapped hole in each member 10 and 11. Each clamping jaw 42 is provided with a vertically disposed semi-circular groove 50 adapted to partially encircle the cable 41.

In the several illustrations, my clamp is shown as tightly gripping a piece of cable, and in order to release the clamp from the cable it is only necessary to turn the hand wheel 36 toward the left, which acts to spread the nut 33 and the yoke 21 apart, due to the right and left hand threads in these parts. Thus it will be seen that the clamping members and jaws 42 and 43 will be opened in a circular direction, each one swinging away from the other on the pivot 12, the points 28 and 29 moving downwardly and the pivoting point moving 12 upwardly.

By the foregoing recited construction it is obvious that I am enabled to obtain great leverage on the jaws to clamp the cable firmly without in any manner marring or buckling the same, moreover by making the clamping jaws removable, I am enabled to readily adapt my clamp to any size cable by simply substituting jaws having grooves to accommodate such cable, and by providing a long bearing surface on the jaws the strain on the strands of the cable is eliminated.

What I claim is:

1. A clamp, comprising a pair of clamping members provided with clamping jaws at oppositely disposed ends, hinged together adjacent said ends, a threaded nut connected to each of the outwardly extending ends of said clamping members by pivoted links, a yoke provided with a threaded bore secured to said clamping member at said hinging point, the threads in said yoke bore being of opposite pitch from the threads in said nut bore, and a threaded stem adapted to coöperate with said yoke and nut bores, whereby said yoke and nut may be moved toward or away from each other.

2. A clamp, comprising a pair of clamping members provided with removable clamping jaws at oppositely disposed ends, and having a plurality of interlocking ears adjacent said ends adapted to form a hinge, and means interposed between the outwardly extending ends of said clamping members and said hinge, whereby said jaws may be opened and closed.

3. A clamp, comprising a pair of clamping members provided with removable jaws having oppositely disposed semicircular grooves hinged together at a point adjacent said jaws, said jaws adapted to partially encircle a cable, and means for moving said jaws to or away from each other and holding them in clamped relation to said cable.

4. A clamp, comprising a pair of clamping members provided with clamping jaws at oppositely disposed ends hinged together adjacent said ends, means for supporting said clamping member on a temper screw, and means interposed between the outwardly extending ends of said clamping members and said hinging point, whereby said jaws may be opened and closed and held rigidly in a clamped position.

5. A clamping device, comprising a pair of clamping members pivotally secured together, said members being provided with clamping jaws on their oppositely disposed ends, a boss having a threaded bore secured to said clamping members at their pivotal point, a threaded nut, links pivotally connecting said nut and the outer ends of said clamping members, and a threaded stem having a pair of threads of opposite pitch engaging said nut and said threaded boss, whereby the clamping jaws may be swung toward or away from each other.

In witness that I claim the foregoing I have hereunto subscribed my name this 19th day of June, 1919.

WILSON B. WIGLE.